Nov. 28, 1939.    G. O. BECKMAN    2,181,558
PRESSURE PLATE ATTACHMENT FOR RETREAD MOLD
Filed March 16, 1938

INVENTOR
G. O. Beckman
BY
ATTORNEY

Patented Nov. 28, 1939

2,181,558

UNITED STATES PATENT OFFICE 2,181,558

PRESSURE PLATE ATTACHMENT FOR RETREAD MOLD

George O. Beckman, Lodi, Calif., assignor to Super Mold Corporation, Lodi, Calif., a corporation of California Application March 16, 1938, Serial No. 196,205

9 Claims. (Cl. 18—18)

This invention relates to full circle tire retreading molds of that type which includes a body consisting of opposed matching sections separable from each other in an axial direction, a matrix consisting of cooperating separable sections mounted in the body to engage both the tread and side wall portions of a tire, the body sections engaging the outer surfaces of the matrix sections throughout their extent, and pressure plate rings rigid with the body disposed radially inward of the body and matrix and substantially alined with the adjacent tire engaging faces of the matrix sections so as to engage and brace the tire radially inward of the matrix sections.

With this form of mold body and pressure plates, it was impossible to successfully use the mold for recapping only, since the matrix sections for this purpose are made to terminate adjacent the side edges of the tread portion of the tire, and the side walls of the tire immediately beyond the tread were unsupported.

It is therefore one of the objects of my invention to provide a pressure plate attachment or extension, one for each fixed pressure plate, adapted to be readily mounted thereon and arranged so as to then extend inside the body radially out from the inner periphery thereof and terminating adjacent the recap matrix when such is used, so as to give the tire the necessary support adjacent said matrix.

Further, the fixed pressure plates, incapable of lateral movement, precluded the desired adjustment sometimes necessary as when recapping tires of the same diameter but whose width, while nominally the same, actually varies to a sufficient degree to prevent proper engagement of the tread of the relatively small width tires with the matrix.

It is therefore a further object of my invention to provide sub-pressure-plate rings adapted to be disposed between the first named pressure plate attachments and the fixed pressure plates, by means of which the former may be shifted laterally inward a distance equal to the thickness of the sub-rings or shims, so that the attachments will then closely engage a relatively small width tire being recapped.

While the sub-rings are particularly intended to be used in connection with the attachment plates, they may also be mounted on the fixed plates alone to engage the side walls of a tire being fully retreaded.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
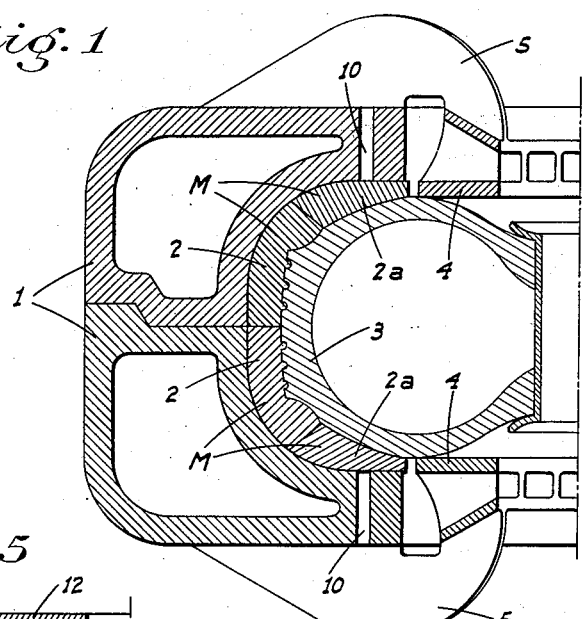
Figure 1 is a fragmentary sectional elevation of a mold of the type above recited, showing the standard construction and equipment necessary for full retreading of a tire.
Figure 5:
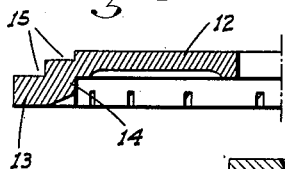
Figure 5 is a similar view of one of the sub-rings or pressure plate shims.
Figure 2:
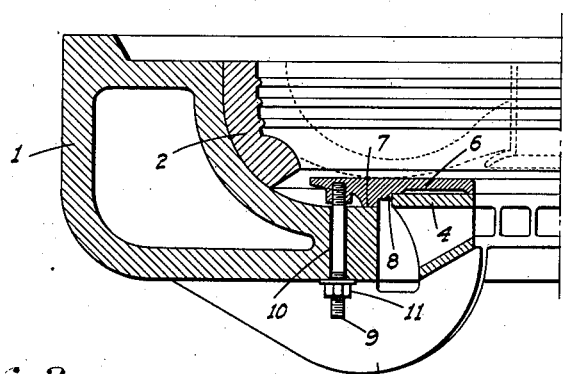
Figure 2 is a similar view of the lower portion only of the mold and accompanying parts, showing one of the pressure plate extensions or attachments mounted on the adjacent fixed pressure plate to cooperate with a recap matrix.

Referring now more particularly to the characters of reference on the drawing, the mold of the type referred to and as here depicted comprises upper and lower mold or body sections 1 each formed with a steam chamber and each adapted to contain and support a tire engaging matrix M; the matrices of the two sections of course cooperating with each other to surround and engage the complete tread portion of the tire 3.

It should here be noted that each matrix is made of two parts as indicated in Fig. 1, one part 2 to engage the tread of the tire and the other part 2a a side wall portion thereof. The body sections extend radially inward the full depth of the matrices so as to completely enclose and support the same.

Formed with the body sections and projecting radially inward from and forming in effect tangential continuations of the matrices, are the fixed flat surfaced pressure plates 4 of ring-like form. The plates are maintained in fixed relation with the body by radial ribs 5 disposed laterally out from the body.

The above equipment is used for a full retread job, but when a recapping operation only is to be performed, the tread engaging matrix part 2 only is mounted in each body section, such matrix terminating short of the inner peripheral edge of said section a considerable distance. In order therefore to provide a support for the side wall of a tire adjacent the recap matrix, I provide an attachment plate 6 for each fixed plate 4. This plate is of ring-like form, of considerably greater radial extent than the plate 4, and extends from the inner peripheral edge thereof to a point just short of the inner periphery of the matrix 2. The plate rests on the inner lateral face of the plate 4, and also has a flat bead or flange 7 intermediate its ends which rest on the inside face of the body section adjacent its inner periphery. The plate is also formed with a shoulder 8 overhanging the outer peripheral edge of plate 4, so as to maintain the attachment against radial displacement. The attachment is removably clamped in position by suitable means such as studs 9 projecting laterally from the attachment radially out from the flange 7 and each projecting through a hole 10 bored in the adjacent portion of the body section clear of the steam chamber. A nut 11 on each stud engages the body and enables the attachment plate to be held in firm frictional engagement with the body and plate 4.

By means of this attachment, it will be seen that the side walls of a tire being recapped may be adequately supported.

In order to dispose the attachment plates farther inward when necessary for reasons given in the preamble, I provide a sub-plate or shim for each attachment plate, which is constructed as follows:

Such sub-plate comprises a main ring 12 of predetermined thickness and of a radial width the same as that of plate 4 on which the sub-plate ring is adapted to rest in place of the attachment plate. Radially out from the main portion 12, the sub-plate is formed with a flange 13 projecting laterally out and adapted to rest against the inside face of the body section in place of the flange 7 of the attachment plate, such flange 13 however terminating short of the bolt holes 10 so as not to cover the same.

The junction of said flange with the adjacent face of the ring 12 forms a shoulder 14 to engage the outer peripheral edge of the plate 4 to locate the sub-plate against radial displacement.

Figure 3:
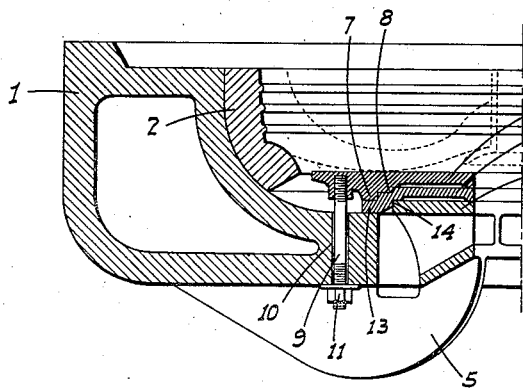
Figure 3 is a view similar to Fig. 2, but showing the sub-ring or shim mounted between the fixed pressure plate and the attachment plate.
Figure 4:
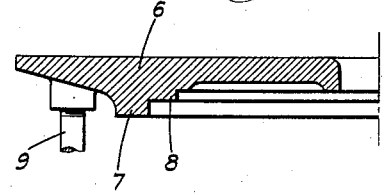
Figure 4 is an enlarged fragmentary section of one of the attachment or extension pressure plates.

On its opposite or laterally inward side, the sub-plate is step cut as at 15 to match with and engage in corresponding steps formed in the outer face of the attachment plate 6 by the shoulder 8 and flange 7 thereof. When the sub-plate is mounted in position on the fixed pressure plate therefor, the attachment plate may be mounted on said sub-plate. The attachment plate will then rest on the sub-plate ring 12, and will occupy the same position radially of the mold as before. The studs and nuts may therefore be again used to clamp it in place, but the attachment plate will be shifted laterally inward a distance equal to the thickness of the ring portion 12 of the sub-plate. A tire of less than theoretical width, for which the attachment plate alone is suited, will therefore be properly engaged on its side walls, as indicated in Fig. 3.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A tire mold comprising a ring-like body, a recap matrix in said body, said body extending radially inward beyond said matrix, a fixed pressure plate rigid with the body on one side thereof and disposed radially inward of the inner periphery of the body in position to bear against the side wall of a tire and a ring-like attachment pressure plate projecting laterally inward from the fixed plate and extending into the body and radially out from said fixed plate a predetermined distance.

2. A structure as in claim 1, with a sub-plate removably disposed on the fixed plate between said plate and the attachment plate to shift the latter laterally inward of the mold.

3. A structure as in claim 1, with a sub-plate removably disposed on the fixed plate between said plate and the attachment plate to shift the latter laterally inward of the mold, and means to removably secure the attachment plate in connection with the body when engaging the fixed plate and when shifted laterally inward.

4. A device as in claim 1, in which the fixed plate is of ring-like form and the attachment plate is provided with an annular flange overlying one peripheral edge of said fixed plate and holding the attachment plate against radial displacement.

5. A device as in claim 1, in which the attachment plate is formed with a flange extending radially out from said plate and overlying the inside face of the body adjacent its inner periphery, and clamping bolts projecting laterally out from the attachment plate radially out from the flange; the body having holes through which said bolts project.

6. A structure as in claim 1, with a sub-plate removably disposed on the fixed plate between said plate and the attachment plate to shift the latter laterally inward of the mold, the fixed plate and sub-plate being also of ring-like form, a flange about the outer periphery of the sub-plate on its laterally outward side overlying and engaging the outer peripheral edge of the fixed plate and having an annular step about its opposite side the same diameter as the fixed plate, and a flange formed on the laterally outward face of the attachment plate engaging said step and overlying said outer peripheral edge of the fixed plate.

7. A device as in claim 1, with an element inserted between the fixed plate and the attachment plate to shift the latter laterally inward and holding the same against lateral outward movement.

8. A structure as in claim 1, with a ring-like sub-plate removably disposed on the fixed plate between said plate and the attachment plate to shift the latter laterally inward, and a flange formed on the sub-plate radially out from the fixed plate and resting against the inside face of the body adjacent its inner periphery.

9. A structure as in claim 1, in which the laterally inner face of the fixed pressure plate is disposed laterally inward of the adjacent inner wall of the body.

GEORGE O. BECKMAN.